United States Patent [19]

Ward

[11] Patent Number: 5,690,182

[45] Date of Patent: Nov. 25, 1997

[54] APPARATUS FACILITATING CONNECTION OF TRAILER IMPLEMENT TO TRACTOR THREE-POINT HITCH SYSTEM

[76] Inventor: William Ward, 22000 Summit Rd., Los Gatos, Calif. 95030

[21] Appl. No.: 628,497

[22] Filed: Apr. 5, 1996

[51] Int. Cl.$^6$ ................................................ B60D 1/00
[52] U.S. Cl. .................. 172/439; 172/248; 280/415.1; 280/416.2
[58] Field of Search ................ 56/DIG. 14; 172/47, 172/413, 443, 439, 677, 240; 280/416.1, 416.21, 415.1

[56] References Cited

U.S. PATENT DOCUMENTS

| | | |
|---|---|---|
| 1,255,222 | 2/1918 | Potts . |
| 2,321,516 | 6/1943 | Robertson . |
| 2,341,807 | 2/1944 | Olmstead et al. ............ 172/439 X |
| 2,544,185 | 3/1951 | Sargent . |
| 2,549,178 | 4/1951 | Dear . |
| 2,570,933 | 10/1951 | Forbes et al. . |
| 2,608,430 | 8/1952 | Robert . |
| 2,635,891 | 4/1953 | Cook . |
| 2,667,366 | 1/1954 | Otjen . |
| 2,671,674 | 3/1954 | Derksen . |
| 2,685,468 | 8/1954 | Blocker et al. . |
| 2,698,567 | 1/1955 | Vlaich ........................ 172/439 X |
| 2,726,880 | 12/1955 | Klein . |
| 2,827,307 | 3/1958 | Osborn . |
| 2,834,608 | 5/1958 | Wixson . |
| 2,838,327 | 6/1958 | Collins . |
| 2,871,030 | 1/1959 | Hollis . |
| 2,872,213 | 2/1959 | Hosford . |
| 2,926,930 | 3/1960 | Pease . |
| 3,037,357 | 6/1962 | Knapp et al. ................ 172/439 X |
| 3,043,618 | 7/1962 | Petirrojo . |
| 3,271,050 | 9/1966 | Saunders . |
| 3,338,594 | 8/1967 | Schuler . |
| 3,433,503 | 3/1969 | Davis . |
| 3,471,171 | 10/1969 | Peterson . |
| 3,527,476 | 9/1970 | Winckler . |
| 3,659,876 | 5/1972 | Melton . |
| 3,716,253 | 2/1973 | Gniffke et al. . |
| 3,717,362 | 2/1973 | Johnson . |
| 3,790,188 | 2/1974 | Johannes . |
| 3,801,134 | 4/1974 | Dees . |
| 3,820,821 | 6/1974 | Leland . |
| 3,922,006 | 11/1975 | Borges . |
| 4,214,776 | 7/1980 | Nurse . |
| 4,239,253 | 12/1980 | Golze . |
| 4,248,450 | 2/1981 | McWethy . |
| 4,280,713 | 7/1981 | Bruhn . |
| 4,340,240 | 7/1982 | Anderson .................... 280/416.2 X |
| 4,343,484 | 8/1982 | Van Antwerp . |
| 4,502,706 | 3/1985 | Frambach . |
| 4,546,994 | 10/1985 | Taylor . |
| 4,863,185 | 9/1989 | Coppe . |
| 5,088,753 | 2/1992 | Granata . |
| 5,476,279 | 12/1995 | Klemetsen .................. 280/416.1 X |

FOREIGN PATENT DOCUMENTS

| | | |
|---|---|---|
| 516467 | 9/1955 | Canada . |
| 230654 | 3/1925 | United Kingdom . |
| 644159 | 10/1950 | United Kingdom . |
| 1548991 | 7/1979 | United Kingdom . |

*Primary Examiner*—Terry Lee Melius
*Assistant Examiner*—Robert Pezzuto
*Attorney, Agent, or Firm*—John J. Leavitt

[57] ABSTRACT

Presented is an apparatus that includes a unitary frame configured to present three mounting portions spacially separated from one another in a triangular pattern and lying in a common plane to be pivotally connected to and supported by the hitch members of a three-point hitch system mounted on the rear of a tractor and actuable hydraulically to alter the elevation of the three-point hitch system and therefore the unitary frame of the apparatus. The apparatus facilitates connecting different types of agricultural and other trailer-type implements to the tractor and for selectively varying the size of the apparatus to accommodate three-point hitch systems of different sizes.

12 Claims, 2 Drawing Sheets

1

APPARATUS FACILITATING CONNECTION OF TRAILER IMPLEMENT TO TRACTOR THREE-POINT HITCH SYSTEM

BACKGROUND OF THE INVENTION

1. Field of the Invention

This invention relates to trailer hitches for hitching trailer vehicles and implements to tractor vehicles, and more particularly relates to apparatus facilitating the connection of farm implements to tractors equipped with a three-point hitch system.

2. Description of the Prior Art

The prior art relating to this invention is believed to be exemplified by the following United States patents discovered as the result of a preliminary patentability and novelty search:

| | | |
|---|---|---|
| 2,321,516 | 3,338,594 | 3,716,253 |
| 4,214,776 | 4,340,240 | 4,343,484 |
| 4,502,706 | | 5,088,753 |

Additional United States patents known to exist include the following:

| | | |
|---|---|---|
| 1,255,222 | 2,544,185 | 2,549,178 |
| 2,570,933 | 2,608,430 | 2,635,891 |
| 2,667,366 | 2,671,674 | 2,685,468 |
| 2,726,880 | 2,827,307 | 2,834,608 |
| 2,838,327 | 2,871,030 | 2,872,213 |
| 2,926,930 | 3,043,618 | 3,271,050 |
| 3,433,503 | 3,471,171 | 3,527,476 |
| 3,659,876 | 3,717,362 | 3,790,188 |
| 3,801,134 | 3,820,821 | 3,922,006 |
| 4,239,253 | 4,248,450 | 4,280,713 |
| 4,546,994 | | 4,863,185 |

Foreign patents known to exist include the following:
Canada—516,467; United Kingdom—230,654; German—861,800; United Kingdom—644,159; United Kingdom—1,548,991

The patents believed to be the most pertinent to the invention described, illustrated and claimed herein are the eight United States patents first above listed that resulted from a preliminary patentability and novelty search.

Many different types of wheeled tractors are provided with three-point hitch systems for secure and flexible connection to a multitude of agricultural implements. The relationship between the tractor's three-point hitch system and the implement, or the implement's tongue, is frequently such that it necessitates that the tractor operator dismount from the tractor and place himself between the tractor and the implement to make the connection. Accordingly, one of the important objects of the present invention is the provision of an apparatus adapted to be interposed between the three-point hitch system of the tractor and the implement that enables connection of the tractor to the implement while the operator remains on the tractor seat.

The relationship between the conventional connecting means on the tractor and the conventional and complementary connecting means on the implement is frequently such that the two connection means do not lie in the same horizontal plane. This necessitates adjustment of one or the other to effect a secure connection. Accordingly, another object of the invention is the provision of an apparatus adapted to be readily mounted on the three-point hitch system of the tractor that incorporates an intermediate connection means that may thus be elevated or lowered in height to correspond to the height of the connection means on the implement.

Tractors come in many different sizes and power levels, and the three-point hitch systems on the different size tractors sometimes vary in size, i.e., the spacially oriented triangular pattern of the mounting ends of the three-point bars or levers vary in size. Accordingly, it is a still further object of the invention to provide a three-point intermediate hitch apparatus that is selectively expandible to fit all conventional sizes of three-point hitch assemblies.

The many different types of agricultural implements frequently utilize many different types of connection means for connecting the implement to the tractor. Accordingly, yet another object of the invention is the provision of an apparatus that is adapted to be mounted on the three-point hitch system of a tractor and which is adapted to accommodate the many different types of connecting means found on a variety of agricultural implements.

A still further object of the invention is the provision of an apparatus adapted for incorporation with a three-point hitch system on a tractor, and which will accommodate ball-type connection means, pin-type connection means, and socket-type connection means, or a combination of all three.

The invention possesses other objects and features of advantage, some of which, with the foregoing, will be apparent from the following description and the drawings. It is to be understood however that the invention is not limited to the embodiments illustrated and described, since it may be embodied in various forms within the scope of the appended claims.

SUMMARY OF THE INVENTION

In terms of broad inclusion, the invention comprises an intermediate apparatus that includes a unitary frame configured to present three connection means spacially separated from one another in a triangular pattern and lying in a common plane, and adapted to be pivotally connected to and supported by the hitch members of a three-point hitch system mounted on the rear of a tractor and actuable hydraulically to alter the elevation of the three-point hitch system and therefore the unitary frame of the intermediate apparatus. Means are provided facilitating mounting the intermediate apparatus on the three-point hitch system of the tractor. Means are also provided for accommodating on the intermediate apparatus frame the different types of implement connecting means that may be found on different types of agricultural implements, and for selectively varying the size of the apparatus frame to accommodate three-point hitch systems of different size.

DESCRIPTION OF THE PREFERRED EMBODIMENTS

Figure 1:
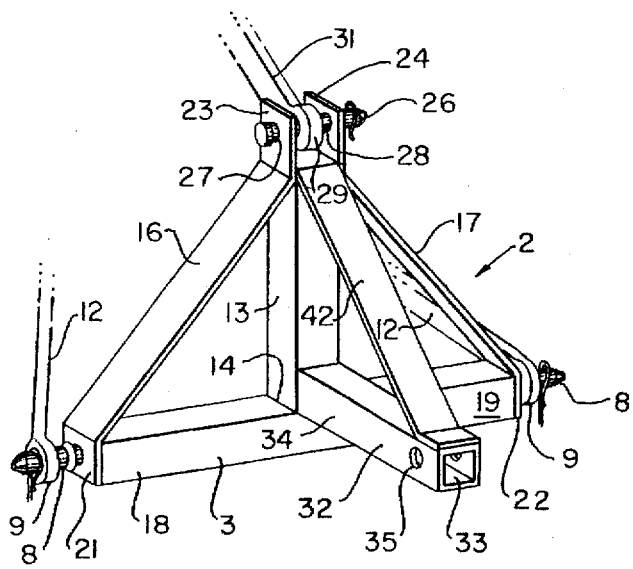
FIG. 1 is a perspective view of a first embodiment of the apparatus of the invention shown connected to the hitch members of a three-point hitch system of a tractor and viewed from the rear of the tractor, i.e., from the implement side of the intermediate apparatus.
Figure 2:
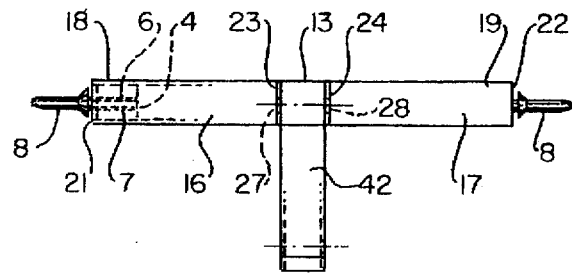
FIG. 2 is a top plan view of the apparatus apart from the hitch members of a three-point hitch system.

In terms of greater detail, the apparatus of the invention is adapted to complement and to be pivotally mounted on the free ends of the conventional three-point hitch system levers or bars so as to pivotally join the three levers together so that they function as a unit upon actuation of the conventional hydraulic controls that actuate a conventional hydraulic cylinder pivotally connected between the tractor and one apex of the triangular mounting pattern defined by the mounting points of the apparatus to the tractor-mounted three-point hitch system. Thus, the elevation of the three-point hitch system, and the apparatus mounted thereon, in relation to the tractor and therefore the ground and any implement supported thereon, may be closely controlled by controlling the extension and retraction of the hydraulic ram. This arrangement facilitates connection of the three-point hitch system and apparatus to many different agricultural implements that have different height requirements for connection thereto.

Referring to the drawings, particularly FIGS. 1-4, it will be seen that the basic intermediate hitch apparatus of the invention is designated generally by the numeral 2, and includes a horizontal beam 3 fabricated conveniently from square cross-section steel tubing. Mounted snugly within each opposite end of the hollow steel beam 3 is a bearing member 4 (FIGS. 2 and 3) conveniently welded to the steel beam, and having a threaded bore 6 extending axially therethrough to receive the complementarily threaded shank 7 of a steel stub shaft journal 8 that extends axially from each end of the steel beam to form a journal for the pivotal connection of the eye members 9 formed or detachably secured on the mounting ends of the levers 12 of the three-point hitch system, the other ends of which levers are pivotally mounted on the tractor in a conventional manner known to those skilled in the art and therefore not requiring explanation or more detailed illustration.

Also forming an integral part of the apparatus frame 2, and welded medianly of the steel beam 3 in a perpendicular orientation thereto, is a tubular steel post 13, the lower end 14 of which is welded to the top surface of the beam 3, while the upper end portion extends away from the beam 3 a distance substantially equal to one-half the length of the horizontal beam 3. This dimensional relationship results in the steel post 13 forming substantially isosceles triangles with the portions of the beam 3 that extend laterally on opposite sides of the post.

To strengthen and rigidly support the post 13, steel straps 16 and 17 integrally connect the upper end portion of the post with the outer end portions 18 and 19 of the steel beam 3 as shown. For greater strength, it will be seen from FIGS. 1 and 3 that at the union of the steel straps with the beam 3, the straps are extended over the ends of the beam in plate portions 21 and 22. Each of the plate portions is centrally bored to admit the passage of the threaded shank 7, and is welded to the associated end of the beam 3 and to the bearing block therewithin into which the shank 7 is threaded. At their upper ends where the steel straps are integrally joined to the associated sides of the post 13, the steel straps 16 and 17 are provided with laterally spaced extension plates 23 and 24, respectively. As shown, the extension plates project above the upper end of the post to provide laterally spaced bearing supports for a journal pin 26 that extends horizontally through aligned apertures 27 and 28 formed, respectively, in the extension plates 23 and 24. The journal pin 26 forms a pivotal connection for the mounting end 29 of the hydraulically controlled three-point hitch system lever arm 31, the opposite end of which (not shown) is suitably connected to the ram of a hydraulic cylinder forming a part of the three-point hitch system of the tractor.

It will thus be seen that the journal pin 26 and the laterally projecting stub shaft journals 8 lie in a common plane, the stub shaft journals being axially aligned, and define the apexes of a substantially isoceles triangle that is rigidly unitary, and which can be manuevered up or down through appropriate control of the conventional hydraulic controls that are commonly found on three-point hitch systems and which control the extension and retraction of the ram to which the lever arm 31 is connected.

To provide a means for connection of the isoceles-shaped triangular frame thus formed with a selected agricultural implement through use of one or another of the commonly used connecting means, such as a pin, or a trailer hitch ball, there is provided mounted medianly on the beam 3 at the base of the post 13, a rearwardly projecting steel tube 32, suitably welded to the beam 3 and the post 13, perpendicular to both, and presenting an open socket end 33 that forms a receptacle for detachably mounting selected connecting means as will hereinafter be explained.

Figure 4:
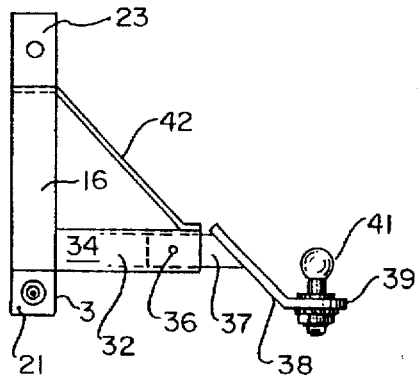
FIG. 4 is a side elevational view of the apparatus apart from the support members of the three-point hitch system, and illustrating the detachable mounting of a trailer hitch ball.
Figure 3:
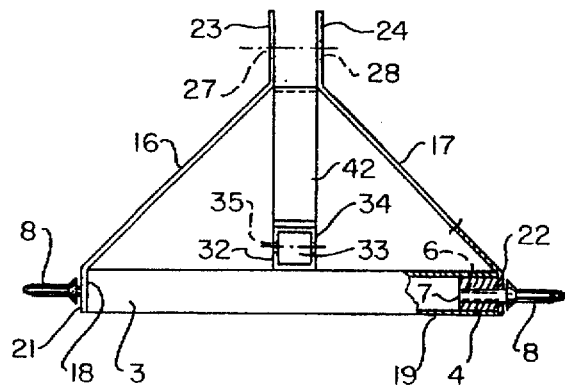
FIG. 3 is a rear elevational view of the apparatus.

For that purpose, the vertical parallel side walls 34 of the end portion of the socket tube are provided with aligned mounting apertures 35 through which a lock pin 36 may be inserted to detachably mount a mating tube portion 37 (FIG. 4) on which is welded a heavy steel strap portion 38 having a mounting plate portion 39 provided with an aperture through which the shank of a trailer hitch ball 41 may be detachably mounted on the mounting plate. To rigidify the union of the tube socket 32 with the beam 3 and post 13, a steel strap 42 is welded at one end to the top wall end portion of the steel tube socket 32 adjacent the open end 33 thereof, while the opposite end of the steel strap 42 extends over and is welded to the upper end portion of the post 13 between the extensions plates 23 and 24 as shown. As seen in FIG. 4, the steel strap 42, the post 13, and the tube socket 32 are dimensioned so as to substantially form a rigid isoceles triangle that forms an integral part of the apparatus frame 2.

It will thus be seen that by extension of the hydraulic ram to which the lever arm 31 is connected, the apparatus 2 will be pivoted rearwardly about the stub shaft journals 8, thus causing the open end of the socket tube, and anything connected thereto, for instance the trailer hitch ball 41, to be lowered. Alternatively, by retraction of the hydraulic cylinder ram through selective manipulation of the hydraulic controls, the upper apex of the major isoceles triangular frame will be pulled forwardly, toward the tractor, thus elevating the open socket end of the socket tube 32 because of pivotal rotation of the beam 3 in relation to the journaled ends 9 of the three-point hitch system levers 12. To elevate the entire apparatus, all that is required is that the hydraulic cylinder and ram to which lever arm 31 is connected be pivoted upwardly where it is pivotally mounted on the tractor.

Referring again to FIG. 4, while there is shown a trailer hitch ball mounted on the apparatus, it should be apparent that other types of connecting means may be mounted on the apparatus. Thus, for instance, the trailer hitch ball assembly may be removed to leave the apertured mounting plate 39 for insertion of a pin (not shown) to pivotally connect an implement to the apparatus. Alternatively, the entire connecting means including the mating tube 37, strap 38 and trailer hitch ball 41 may be removed by withdrawing the lock pin 36 and replacing the entire assembly with another and different connecting assembly that is compatible with a selected implement.

Tractors equipped with three-point hitch systems exist in various sizes. Accordingly, the three-point hitch systems mounted on these various size tractors may also be provided in various sizes. The embodiment of the invention illustrated in FIGS. 5 and 6 is designed for universal accommodation of the various size three-point hitch systems likely to be encountered.

Figure 5:
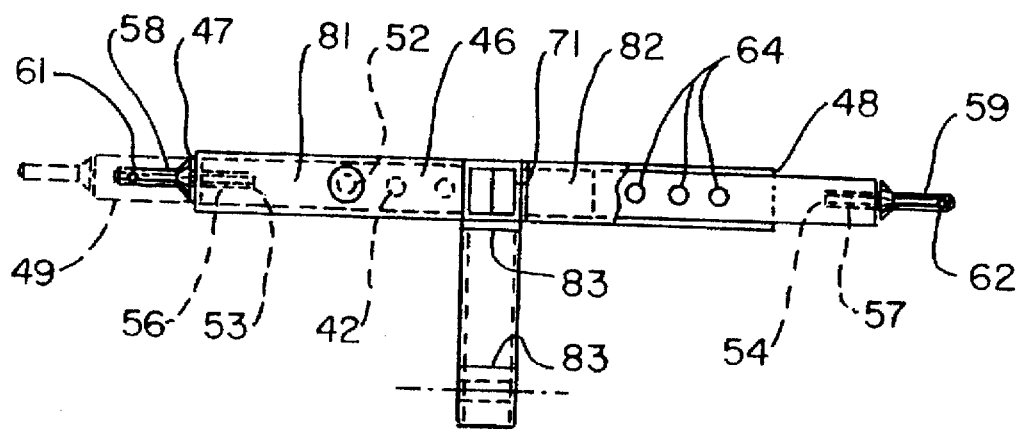
FIG. 5 is a top plan view of a second embodiment of the three-point hitch system apparatus equipped to enable selective lateral size adjustment of the apparatus frame to accommodate three-point hitch systems of different sizes. A portion of the structure is broken away to reveal the underlying structure.
Figure 6:
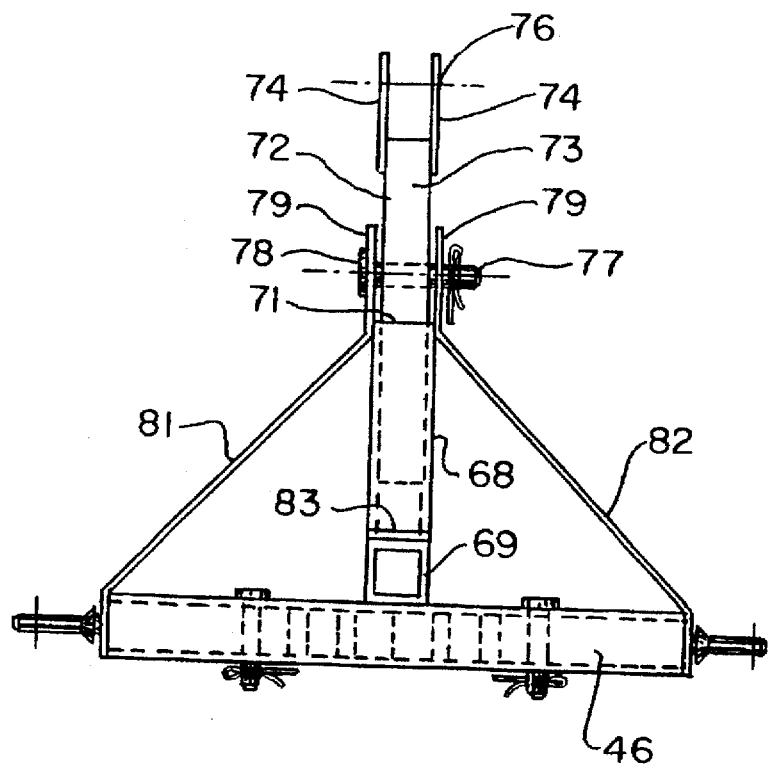
FIG. 6 is a rear elevational view of the selective lateral size adjustable apparatus frame of FIG. 5 illustrating the adjustability of the apparatus frame also in a vertical dimension.

As illustrated in FIG. 5, the horizontal beam 46 is formed from tubular steel having a square cross-section. At opposite ends 47 and 48 the tubular beam is open. Slidably disposed snugly within the open ends 47 and 48, respectively, are tubular steel inserts 49 and 51, each dimensionally sized to telescope snugly within the tubular beam 46. A pair of aligned bores 52 are provided extending through the top and bottom beam walls for a purpose which will hereinafter appear. The inserts 49 and 51 are preferably proportioned in length so that when fully inserted, as shown in FIG. 6, their inner ends abut medianly of the enclosing beam.

In this fully inserted (retracted) relationship of the inserts in relation to the beam 46, the opposite or outer ends of the insert tubes are substantially flush with the associated open ends of the beam 47. Welded within the open outer ends of the tubular insert tubes 49 and 51 are bearing members 53 and 54, respectively. Each bearing member 53 and 54 is centrally bored and threaded to threadably receive, respectively, the threaded shanks 56 and 57 of steel stub shaft journals 58 and 59, respectively. Appropriate transverse bores 61 and 62 are provided adjacent the free ends of the journals 58 and 59, respectively, to receive a cotter pin or other lever retention device 63 as shown in FIG. 1.

To enable lateral (telescopic) adjustment and retention of the slidable tubular inserts 49 and 51, each of the inserts is provided through its top and bottom walls with a plurality of aligned bore pairs 64 spaced longitudinally along the insert. Thus, when it is necessary to expand the lateral spacing between journals 58 and 59 to accommodate a larger three-point hitch system, each insert is slidably displaced outwardly until a selected one of the bore pairs 64 is aligned with the bore pair 52. Then, as shown in FIG. 6, lock pins 66 are inserted through the aligned bore pairs 52 and 64 and provided with cotter pins 67, thus locking the inserts in their selected expanded (or retracted) positions to place the journals 58 and 59 at the appropriate lateral spacing for interconnection with the three-point hitch lever arms 12.

To provide the same type of adjustment for height of the apparatus, the tubular vertical steel post 68, welded at its bottom end to the rearwardly projecting steel tube 69, is provided with an open top end 71 dimensioned to snugly receive therein the adjustable tubular steel insert 72. The adjustable tubular steel insert 72 is provided at its upper end portion 73 with spaced bearing plates 74 provided with aligned bores 76 adapted to receive a journal pin (not shown) but similar to the journal pin 26 (FIG. 1) and for the same purpose, namely, to pivotally journal the eye 29 of lever 31. A mounting pin 77 passing through aligned apertures 78 in the spaced extension plates 79 and the tubular insert 72 locks the insert in selected position.

As with the embodiment of FIG. 1, the apparatus of FIGS. 5 and 6 is rigidified by welded reinforcing steel straps 81 and 82 connecting the outer ends of the beam 46 to the upper end portion of post 68 and integral with the extension plates 79. In like manner, a welded strap 83 connects the rear end portion of tube 69 (FIG. 6) with the upper end portion of vertical steel post 71 as shown in FIG. 5.

Thus, the apparatus of FIGS. 5 and 6 is comprised of four interrelated isoceles triangles in the same manner as the embodiment of FIG. 1. Referring to FIG. 1, one major isoceles triangle is formed by the beam 3 and steel straps 16 and 17 welded to the upper end portion of post 13. This major isoceles triangle, formed by the structural members indicated, may be said to lie in a first plane. A second isoceles triangle is formed by strap 16, post 13 and one half of beam 3. In like manner, a third isoceles triangle is formed by straps 17, post 13 and the other half of beam 3. The fourth isoceles triangle is formed by post 13, beam 32 and strap 42. Three of the isoceles triangles thus lie in the first plane, while the fourth isoceles triangle lies in a second plane perpendicular to the first plane.

Essentially the same structural relationships exist in the embodiment of FIGS. 5 and 6 wherein the major isoceles triangle is formed by beam 46, strap 81 and strap 82. Included within the plane of this major isoceles triangle are two smaller isoceles triangles defined by one half of beam 46, strap 81 and post 71, and by the other half of beam 46, strap 82 and post 71. The fourth isoceles triangle in this embodiment is formed by beam 69, post 71 and strap 83. It will therefore be understood that a highly rigid yet easily manipulable intermediate apparatus has been provided to connect a conventional three-point hitch system to a selected implement.

Having thus described the invention, what is believed to be new and novel and sought to be protected by letters patent of the United States is as follows.

I claim:

1. Apparatus facilitating connection of a three-point hitch system adjustably mounted on a tractor to an implement adapted to trail the tractor, said apparatus comprising:
   a) unitary frame means configured to present three mounting portions spacially separated from one another in generally an isosceles triangular pattern and lying in a common plane;
   b) connection means mounted on each said mounting portion of said unitary frame means and lying in said common plane for selective pivotal connection to said three-point hitch system for complementary adjustment of said unitary frame means corresponding to the adjustment of said three-point hitch system in relation to said tractor; and
   c) means mounted on said unitary frame means spaced rearwardly from said common plane and generally coincident with a plane perpendicular to said common plane and including two of said spacially separated mounting portions for operatively engaging said implement to be trailed behind said tractor.

2. The combination according to claim 1, wherein said unitary frame means includes an elongated tubular first beam opposite ends of which constitute two of said separated mounting portions, bearing members mounted within opposite ends of said tubular first beam, and two of said connection means are mounted on said bearing members.

3. The combination according to claim 1, wherein said unitary frame means includes a tubular metal post attached by one end to said tubular first beam medianly between opposite ends thereof and perpendicular thereto.

4. The combination according to claim 3, wherein said unitary frame means includes a pair of reinforcing straps connected to opposite end portions of said tubular first beam and to the end portion of said tubular metal post remote from the end thereof attached medianly to said tubular first beam.

5. The combination according to claim 3, wherein said unitary frame means includes a tubular metal second beam attached by one end to said tubular first beam medianly between opposite ends thereof and perpendicular thereto and attached by the same end to said tubular metal post and perpendicular thereto.

6. The combination according to claim 5, wherein a reinforcement strap is provided having opposite end portions attached to the end portions of said tubular metal post and tubular metal second beam remote from said first beam.

7. The combination according to claim 4, wherein said pair of reinforcing straps at their ends connected to said end portion of said tubular metal post are provided with spaced parallel extension plates integral with said reinforcing straps, said extension plates being apertured transversely in the plane of said unitary frame means to facilitate pivotal attachment to said extension plates of said three-point hitch.

8. The combination according to claim 2, wherein said two connection means are removably mounted on said bearing members.

9. The combination according to claim 2, wherein said bearing members are fixedly mounted unremovably in said separated mounting portions.

10. The combination according to claim 2, wherein said bearing members mounted within said two separated mounting portions of said tubular first beam are slidably adjustable in relation the mounting portion with which each is associated, and means are provided for locking said slidably adjustable bearing members in selected positions.

11. The combination according to claim 10, wherein said unitary frame means includes a tubular metal post attached by one end to said tubular first beam medianly between opposite ends thereof and perpendicular thereto, an adjustable metal insert slidably disposed in the end portion of said tubular metal post remote from the end thereof attached medianly to said tubular first beam, means for fixing said adjustable metal insert in a selected position, and means on said metal insert to facilitate pivotal attachment to said three-point hitch.

12. The combination according to claim 11, wherein said unitary frame means includes a pair of reinforcing straps connected to opposite end portions of said tubular first beam and to the end portion of said tubular metal post remote from the end thereof attached medianly to said tubular first beam, a tubular metal second beam attached by one end to said tubular first beam medianly between opposite ends thereof and perpendicular thereto and attached by the same end to said tubular metal post and perpendicular thereto, and a reinforcement strap having opposite end portions attached to the end portions of said tubular metal post and tubular metal second beam remote from said first beam.

* * * * *